UNITED STATES PATENT OFFICE.

PETER B. BIRD, OF NEW YORK, N. Y.

BOILER COMPOUND.

No. 810,838.  Specification of Letters Patent.  Patented Jan. 23, 1906.

Application filed July 3, 1905. Serial No. 268,187.

*To all whom it may concern:*

Be it known that I, PETER B. BIRD, a citizen of the United States, residing at New York, in the county of New York and State of New York, have invented certain new and useful Improvements in Boiler Compounds and Processes of Making the Same, of which the following is a full, clear, and exact specification.

This invention relates to improvements in boiler compounds and process of making the same, such as are adapted to remove scale, oil, and grease to prevent the formation of new, as well as pitting, corrosion, and galvanic action, and which obviates the necessity of using zinc without cutting lubrication, injuring packing, or causing foaming and priming. These objects I accomplish by means of a compound which forms when combined with the solid matters carried by the water amalgams or glazes which protect the boiler-plate without involving loss of heat or the production of hard closely-adhering scale.

The compound which is the subject of this invention comprises mercury combined with an alkaline salt or earth, together with a vegetable astringent, as tannin, gambia, sumac, hemlock, or the substance commercially known as "kutch," and small proportions of animal oil, and a carbohydrate, such as dextrine, gum-arabic, starch, or molasses. This compound I make up in the form of a soluble "extract" or viscous substance in which the ingredients are all thoroughly combined ready to be used upon the addition of water and which can be made up and stored without danger of deterioration.

In making up my improved extract compound I use approximately the following proportions, viz: one pound of vegetable astringent, as tannin, one pound of alkali, as soda ash, and boil in about one pint of water until dissolved. Then to this solution is added one pound of carbohydrate, such as above mentioned, to each gallon of liquid and the solution boiled until the carbohydrate is dissolved. This solution is then cooled, and to each gallon thereof is added about ten ounces of a saturated solution of mercury, preferably in the form of a salt, as nitrate, oxid, or chlorid, in an oil—such, for instance, as animal oil or its equivalent—which solution of mercury salt dissolves in the alkali solution, forming a heavy viscous substance or paste, the whole being then ready for use upon the addition of water to make it fluid. I have found that this paste will keep indefinitely without separation or deterioration and in this extract form can be shipped long distances, thus making it suitable for ships on long voyages and enabling a sufficient supply to be carried for a complete voyage.

It will be understood that the invention is not to be restricted to the exact proportions above mentioned, as these will vary in details according to the particular nature of the water with which the compound is to be used.

In using the compound I add about one pound for each hundred horse-power to remove the scale already formed and thereafter smaller quantities to prevent the formation of new. A thin closely-adhering amalgam will be caused to be formed by my compound on the surface of the boiler below the water-line, which prevents pitting, corrosion, and galvanic action without being of such nature as to cause loss of heat. The action of my compound is generally to clean the surface of the boiler-plate and then to cause a deposit thereon of a thin metallic amalgam or glaze to which scale will not adhere. Further chemical action on the boiler-plate is thus prevented, as well as increase in the thickness of the coating when once formed, by continued accretion. This compound also removes all oil, grease, and other matters without itself attacking packings or bearings or forming substances which would do so. The addition of further small quantities of my compound at intervals causes in some cases only a soft sludge or mud to be formed, which can be easily blown out, and in others the solid matters are held in suspension, depending upon the nature of the waters used. I thus by my compound prevent galvanic action and do away with the necessity of using zinc and prevent injury to the boiler.

Having thus described my invention, I declare that what I claim as new, and desire to secure by Letters Patent, is—

1. The herein-described compound for preventing incrustation in boilers, comprising vegetable acid, alkaline salt, carbohydrate as herein specified, mercury, and oil in about the proportions described.

2. The process of forming a paste boiler compound, consisting in boiling together proportions of vegetable astringent and alkali, dissolving therein by boiling, a proportion of carbohydrate as herein specified, and adding thereto, when at a suitable temperature, a solution of mercury in animal oil, whereby a paste of permanent character is formed.

3. The process of forming a boiler compound, consisting in making a solution of one or more substances, such as alkali, vegetable acid, and carbohydrate as herein specified, and adding thereto to form a permanent paste, a solution of mercury and oil, substantially as described.

In testimony whereof I affix my signature in presence of two witnesses.

PETER B. BIRD.

Witnesses:
JULIAN S. WOOSTER,
GEO. A. HOFFMAN.